United States Patent Office 3,265,687
Patented August 9, 1966

3,265,687
COMPLEX HYDRAZONES CONTAINING THE FERROCENE STRUCTURE
John W. Cusic, Skokie, and Peter Yonan, Chicago, Ill., assignors to G. D. Searle & Co., Chicago, Ill., a corporation of Delaware
No Drawing. Filed July 29, 1963, Ser. No. 298,442
1 Claim. (Cl. 260—240)

The present invention relates to a group of compounds which are hydrazone derivatives of 1-diphenylmethyl-4-aminopiperazine and which also contain a ferrocenyl group. More particularly, it relates to compounds having the following general formula

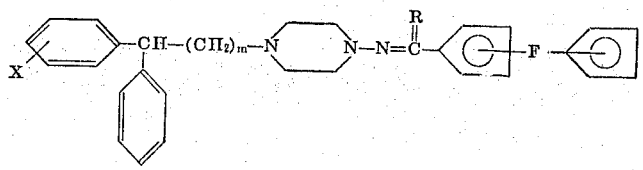

wherein X is selected from the group consisting of hydrogen, halogen, and methyl; $m$ is a whole number between 0 and 2 inclusive; and R is selected from the group consisting of hydrogen, methyl, and phenyl. The halogens referred to above include fluorine, chlorine, bromine, and iodine.

The compounds of this invention are useful because of their pharmacological properties. In particular, they are pepsin inhibitors and anti-ulcer agents. The latter activity is demonstrated by their inhibition of ulceration in the Shay rat.

The organic bases of this invention form non-toxic addition salts with a variety of organic and inorganic acids. Such salts are formed with acids such as sulfuric, phosphoric, hydrochloric, hydrobromic, hydriodic, sulfamic, citric, lactic, maleic, malic, succinic, tartaric, cinnamic, acetic, benzoic, gluconic, ascorbic, and related acids.

The compounds of the present invention can be prepared by heating an appropriately substituted N-aminopiperazine with an aldehyde or ketone which contains a ferrocenyl group. The reaction is conveniently carried out in an inert solvent. Useful solvents for this reaction are alcohols such as ethanol and 2-propanol, and aromatic hydrocarbons such as benzene and toluene. The reaction can be carried out in the presence of a small amount of acid which serves to promote the reaction. Acetic acid is useful for such purposes.

The compounds which constitute this invention and their preparation will appear more fully from a consideration of the following examples which are given for the purpose of illustration only and are not to be construed as limiting the invention in spirit or in scope. In the examples, quantities are in parts by weight and temperatures are in degrees centigrade (° C.).

Example 1

To a suspension of 200 parts of 1-diphenylmethylpiperazine and 400 parts of water is added gradually 190 parts of concentrated hydrochloric acid with cooling in an ice bath. The resultant mixture is stirred for one hour, the insoluble material is filtered off, and the filtrate is cooled to 10° C. A solution of 57 parts of sodium nitrite and 200 parts of water is added portionwise over a period of three hours. The precipitate which forms is filtered off, washed with dilute hydrochloric acid, and dried overnight. Recrystallization of the product from 790 parts of absolute ethanol gives the purified hydrochloride which is then suspended in 1000 parts of water and 1760 parts of benzene. A slight excess of aqueous sodium hydroxide is added and the mixture is stirred until all the solid has dissolved. The benzene solution is washed with water and dried and the solvent is evaporated. The residual base is recrystallized from heptane to give 1-diphenylmethyl-4-nitrosopiperazine melting at about 110–111° C.

Example 2

A solution of 10 parts of 1-diphenylmethyl-4-nitrosopiperazine in 140 parts of anhydrous ether and 5 parts of benzene is added portionwise to a suspension of 1.9 parts of lithium aluminum hydride in 140 parts of ether. The reaction mixture is stirred for one hour at room temperature and then refluxed and stirred for two hours. The reaction mixture is cooled in an ice bath and excess lithium aluminum hydride is decomposed by the addition of ethyl acetate. The reaction mixture is hydrolyzed by the dropwise addition of 2 parts of water, 2 parts of 20% sodium hydroxide solution and 6 parts of water. The inorganic salts are filtered off and washed with ether and the resultant filtrate is dried over sodium sulfate. The solvent is evaporated, the residue is dissolved in benzene, and the solvent is evaporated once again to give 1-diphenylmethyl-4-aminopiperazine melting at about 106–109° C.

Example 3

A solution is prepared from 6.5 parts of 1-diphenylmethyl-4-aminopiperazine, 5 parts of ferrocenecarboxaldehyde and 40 parts of 2-propanol. To this solution is added 0.1 part of glacial acetic acid and the resultant solution is heated on a steam bath for five minutes. The mixture is then stirred and cooled to give a crystalline product which is then recrystallized from ethanol. The product thus obtained is 1-diphenylmethyl-4-ferrocenylmethyleneaminopiperazine and it melts at about 143–144° C. This compound has the following formula

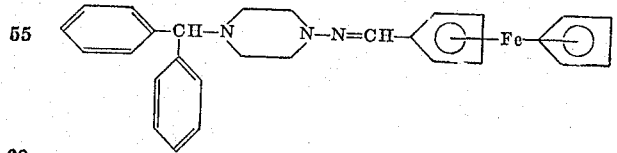

What is claimed is:
1 - diphenylmethyl - 4 - ferrocenylmethyleneaminopiperazine.

No references cited.

WALTER A. MODANCE, Primary Examiner.
H. I. MOATZ, Assistant Examiner.